March 20, 1956  E. STARK  2,738,822
MACHINE FOR MANUFACTURING GLIDE FASTENERS
Filed Nov. 26, 1951  18 Sheets-Sheet 1

INVENTOR
Eduard Stark
BY
Edward P. Connors
ATTORNEY

March 20, 1956  E. STARK  2,738,822
MACHINE FOR MANUFACTURING GLIDE FASTENERS
Filed Nov. 26, 1951  18 Sheets-Sheet 2

INVENTOR
Eduard Stark
BY
Edward T. Connors
ATTORNEY

March 20, 1956     E. STARK     2,738,822
MACHINE FOR MANUFACTURING GLIDE FASTENERS
Filed Nov. 26, 1951     18 Sheets-Sheet 3

INVENTOR
Eduard Stark
BY
Edward V. Connors
ATTORNEY

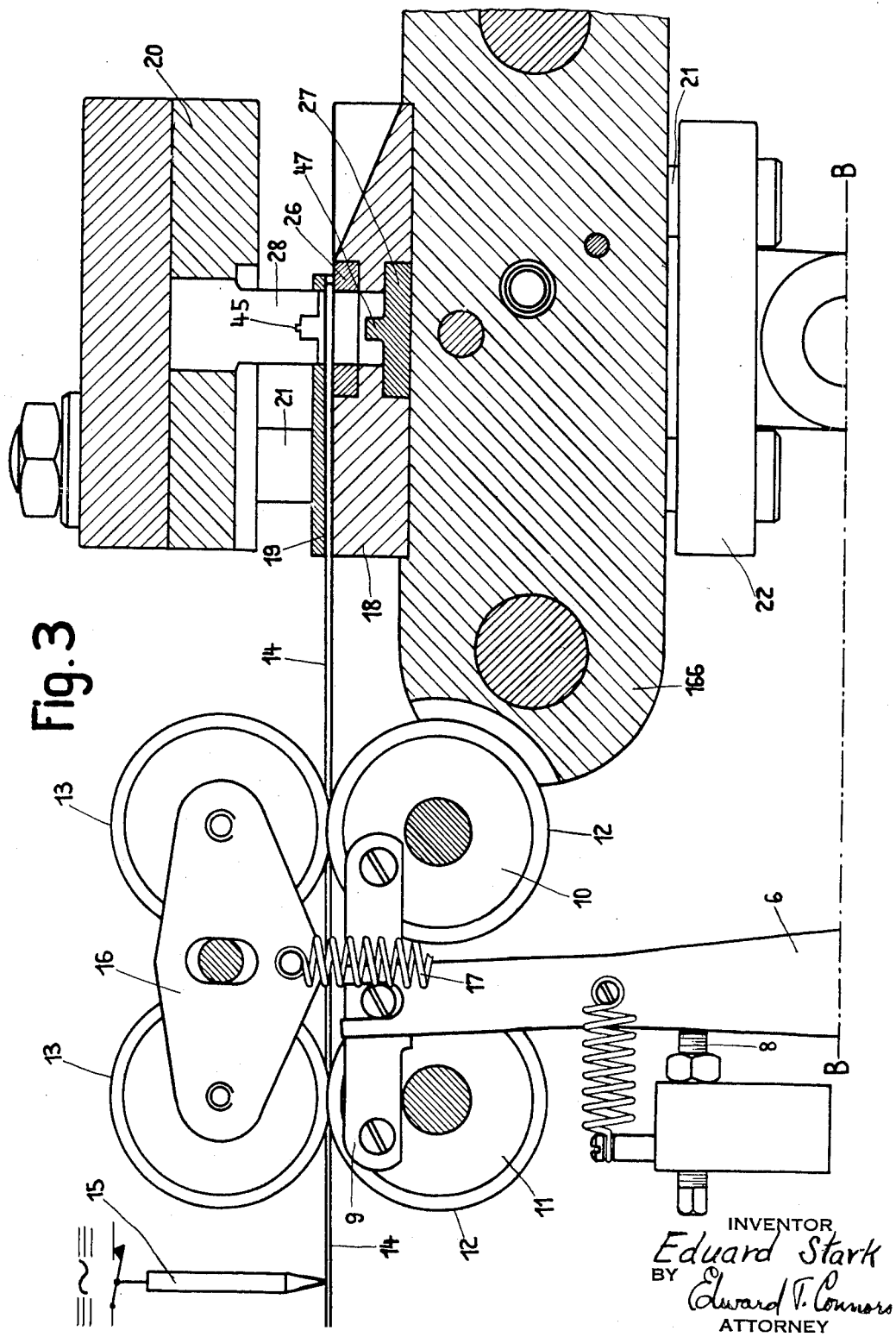

March 20, 1956  E. STARK  2,738,822
MACHINE FOR MANUFACTURING GLIDE FASTENERS
Filed Nov. 26, 1951  18 Sheets-Sheet 5
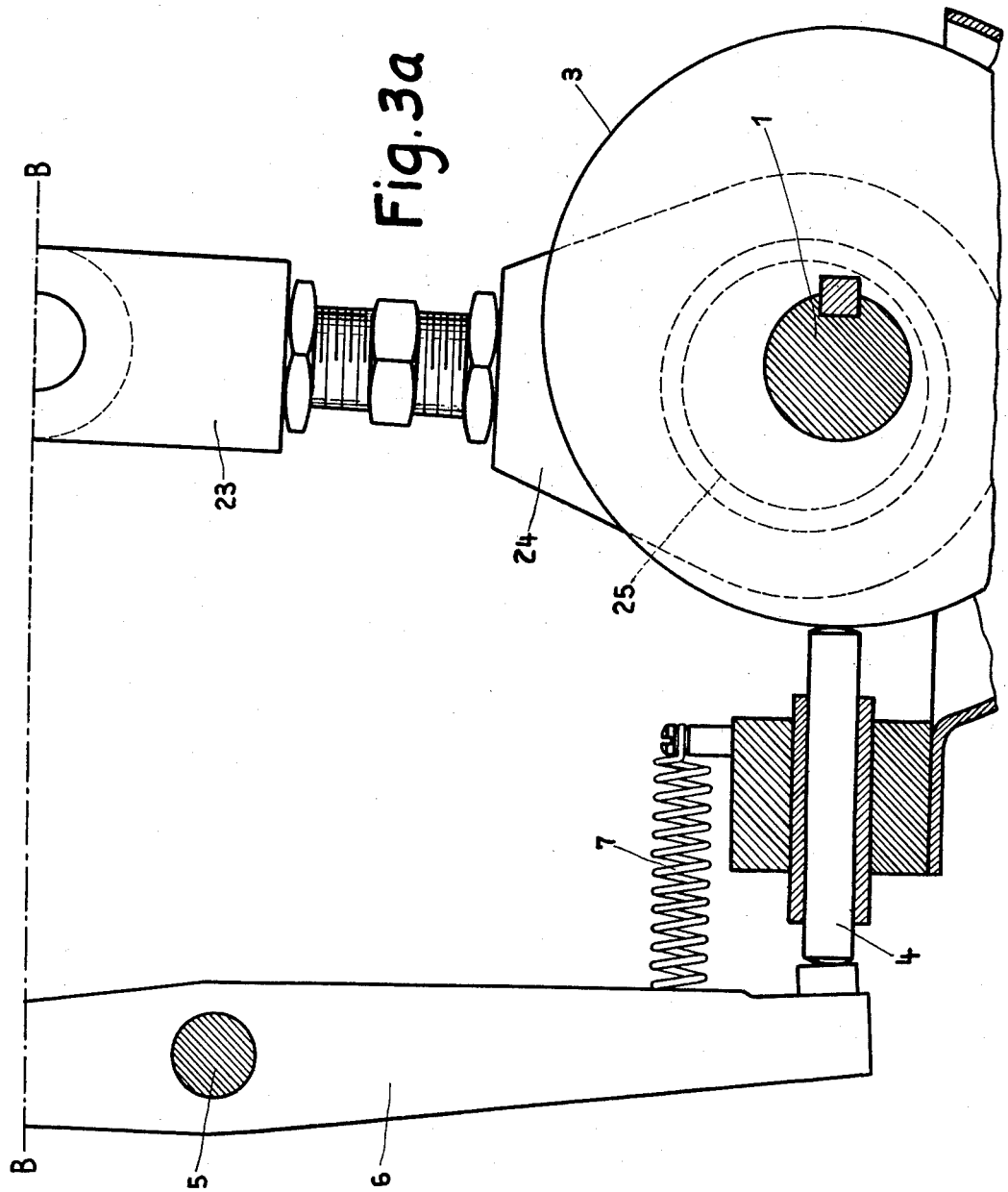
INVENTOR
Eduard Stark
BY
Edward T Connors
ATTORNEY March 20, 1956  E. STARK  2,738,822
MACHINE FOR MANUFACTURING GLIDE FASTENERS
Filed Nov. 26, 1951  18 Sheets-Sheet 6
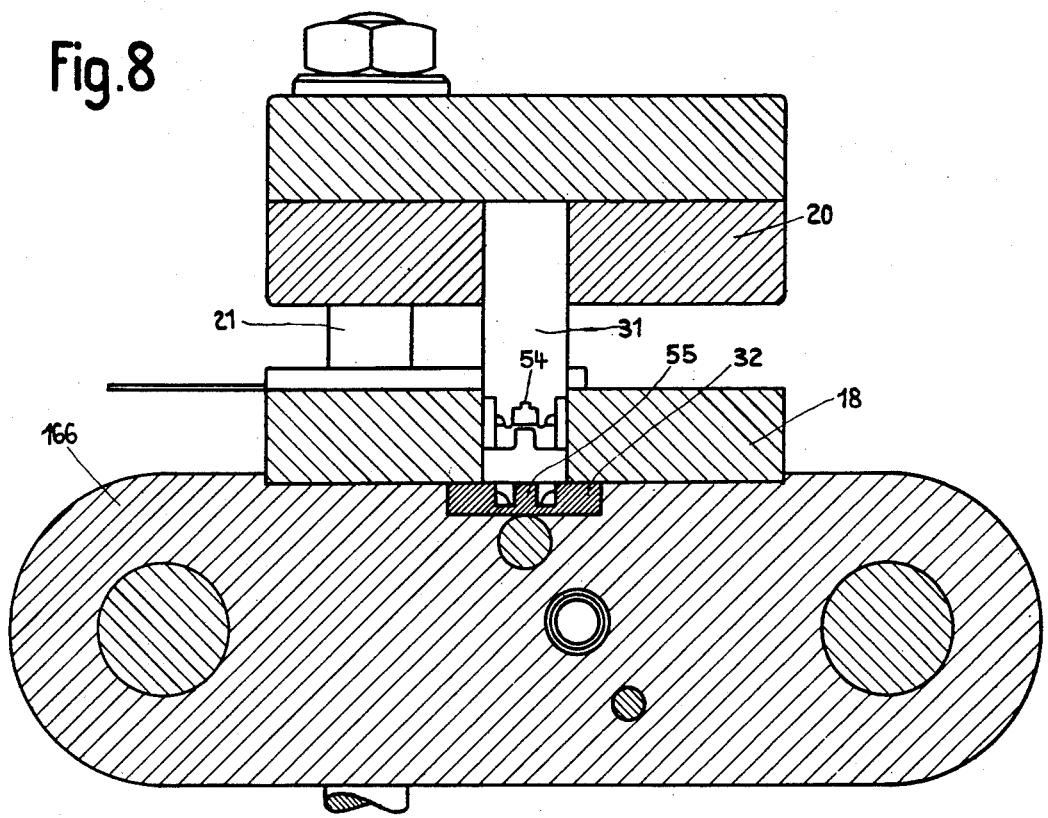
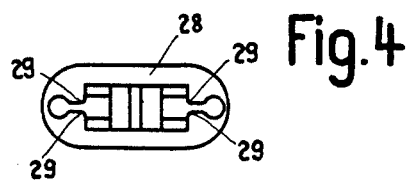
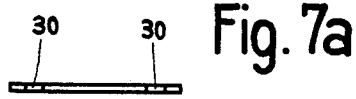
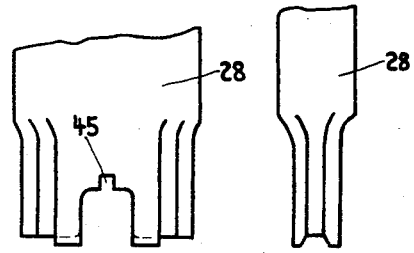
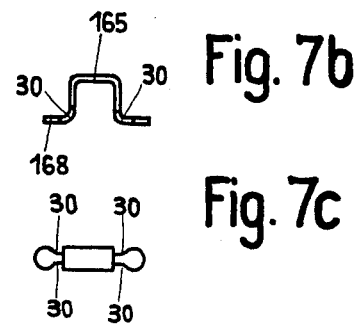
INVENTOR
Eduard Stark
BY
Edward T. Connors
ATTORNEY March 20, 1956  E. STARK  2,738,822
MACHINE FOR MANUFACTURING GLIDE FASTENERS
Filed Nov. 26, 1951  18 Sheets-Sheet 7

INVENTOR
*Eduard Stark*
BY
*Edward T. Connors*
ATTORNEY

March 20, 1956 E. STARK 2,738,822
MACHINE FOR MANUFACTURING GLIDE FASTENERS
Filed Nov. 26, 1951 18 Sheets-Sheet 8

INVENTOR
Eduard Stark
BY
Edward P. Connors
ATTORNEY

March 20, 1956   E. STARK   2,738,822
MACHINE FOR MANUFACTURING GLIDE FASTENERS
Filed Nov. 26, 1951   18 Sheets-Sheet 9
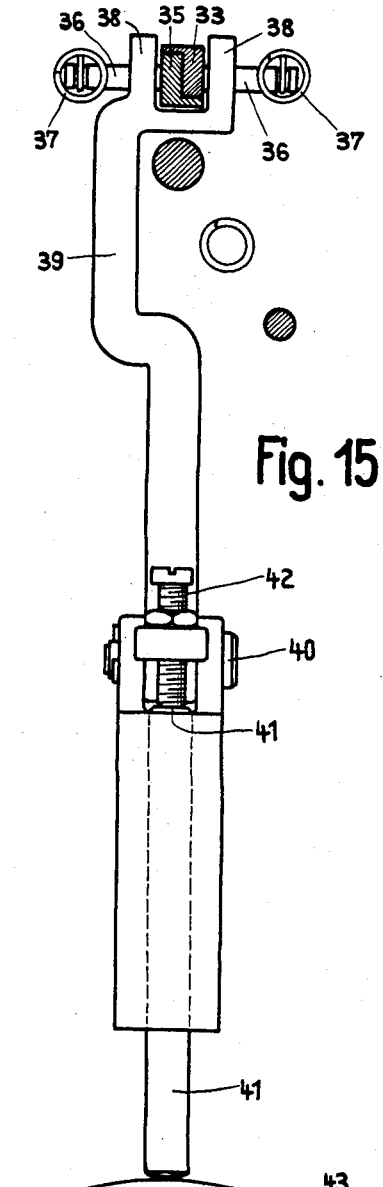
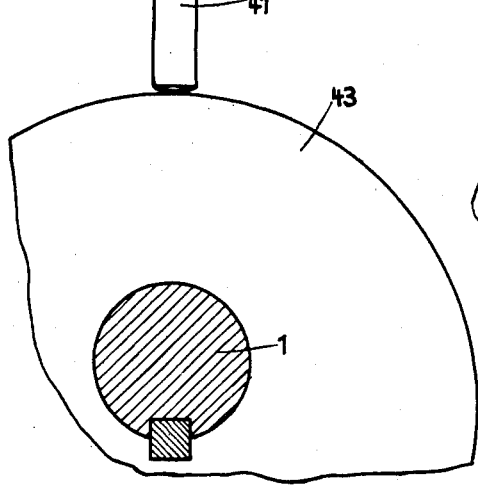
Fig. 15
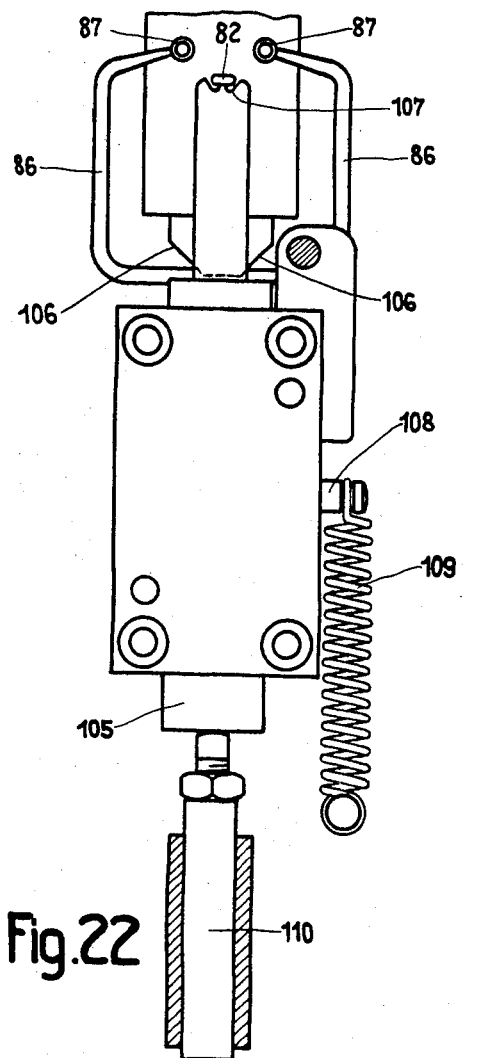
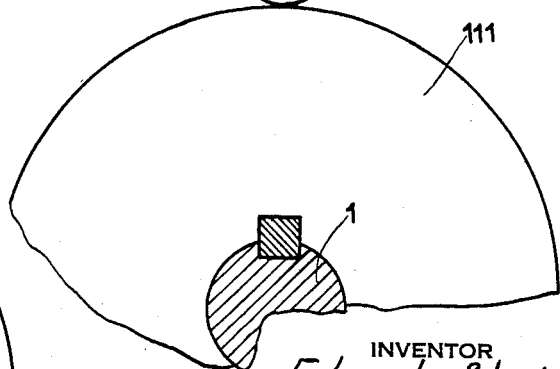
Fig. 22
INVENTOR
Eduard Stark
BY
Edward F. Connors
ATTORNEY March 20, 1956 E. STARK 2,738,822
MACHINE FOR MANUFACTURING GLIDE FASTENERS
Filed Nov. 26, 1951 18 Sheets-Sheet 10
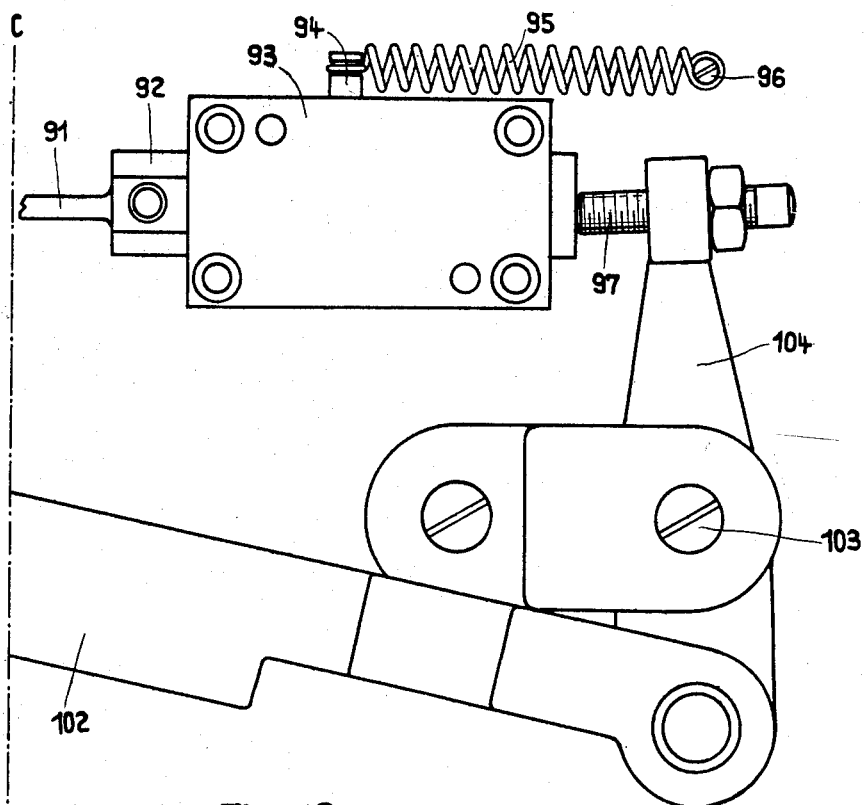
Fig. 19a
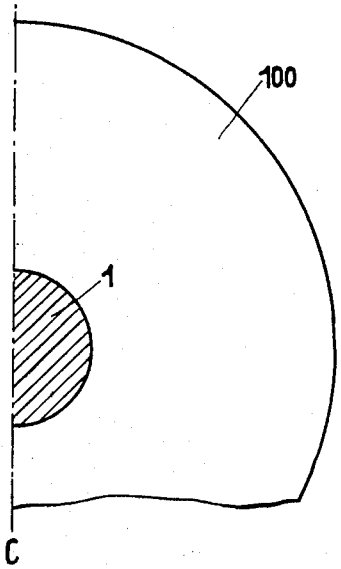
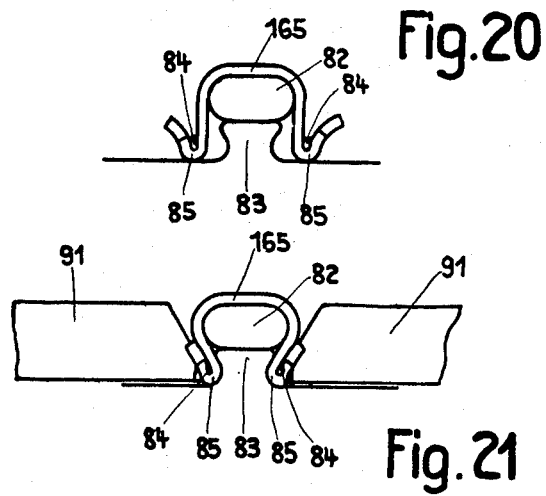
Fig. 20
Fig. 21
INVENTOR
Eduard Stark
BY
Edward F. Connors
ATTORNEY March 20, 1956  E. STARK  2,738,822

MACHINE FOR MANUFACTURING GLIDE FASTENERS

Filed Nov. 26, 1951  18 Sheets-Sheet 11

INVENTOR
Eduard Stark
BY Edward P. Connors
ATTORNEY

March 20, 1956  E. STARK  2,738,822

MACHINE FOR MANUFACTURING GLIDE FASTENERS

Filed Nov. 26, 1951  18 Sheets—Sheet 13

INVENTOR
*Eduard Stark*
BY *Edward T. Connors*
ATTORNEY

March 20, 1956  E. STARK  2,738,822
MACHINE FOR MANUFACTURING GLIDE FASTENERS
Filed Nov. 26, 1951  18 Sheets-Sheet 15

INVENTOR
Eduard Stark
BY
Edward T. Connors
ATTORNEY

March 20, 1956 — E. STARK — 2,738,822
MACHINE FOR MANUFACTURING GLIDE FASTENERS
Filed Nov. 26, 1951 — 18 Sheets-Sheet 16
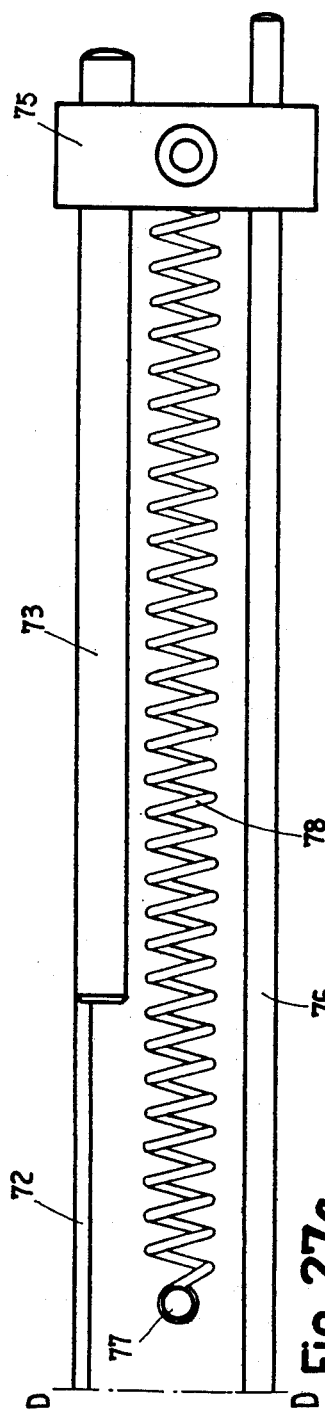
Fig. 27a
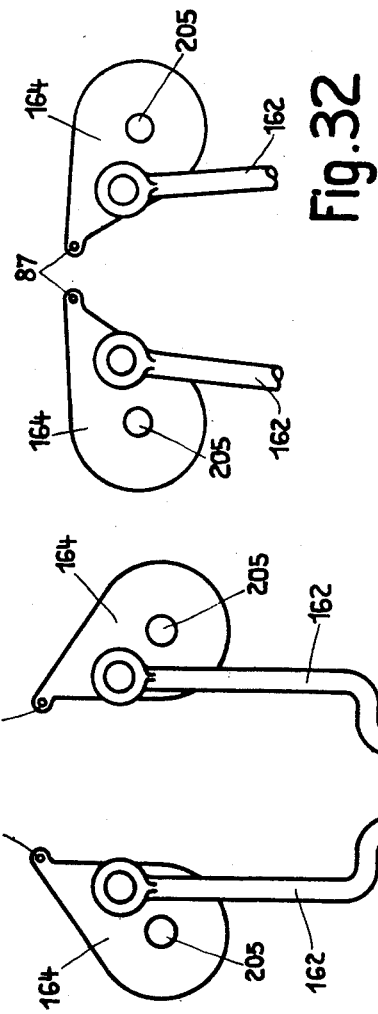
Fig. 32
Fig. 31
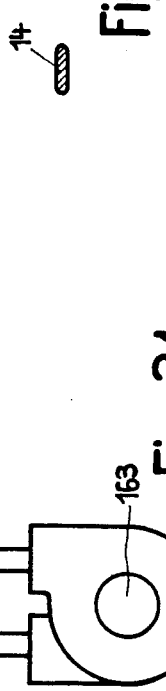
Fig. 33
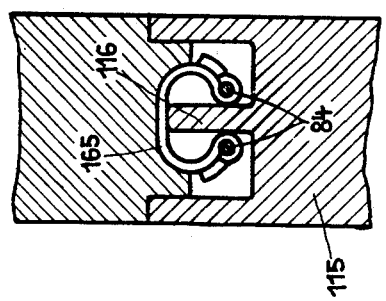
Fig. 28
INVENTOR
Eduard Stark
BY Edward F. Connors
ATTORNEY March 20, 1956  E. STARK  2,738,822
MACHINE FOR MANUFACTURING GLIDE FASTENERS
Filed Nov. 26, 1951  18 Sheets—Sheet 17

INVENTOR
Eduard Stark
BY Edward T. Connors
ATTORNEY

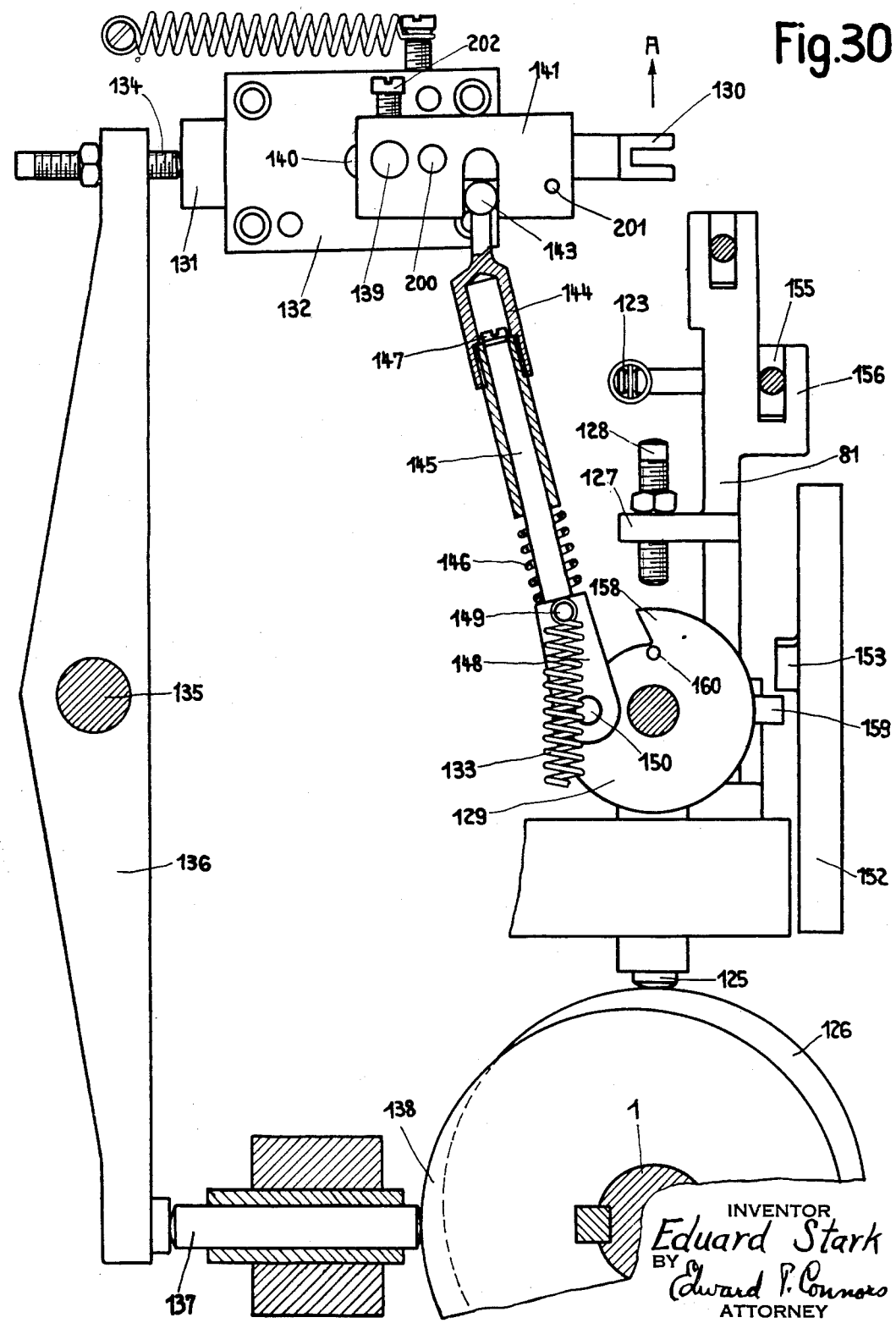

United States Patent Office 2,738,822
Patented Mar. 20, 1956

2,738,822

MACHINE FOR MANUFACTURING GLIDE FASTENERS

Eduard Stark, Biel-Mett, Switzerland, assignor of seventy-five per cent to Alfred Schmidhalter, Ried-Brig, Switzerland Application November 26, 1951, Serial No. 258,241
Claims priority, application Switzerland Feb. 19, 1951

8 Claims. (Cl. 153—1)

The invention relates to a machine for manufacturing glide fasteners having glide members attached to flexible pulling means such as cords, for instance.

To avoid confounding slide fasteners with glide fasteners, I define the glide fastener as follows:

A glide fastener serves to hold together two cloth bands or the like having a bead each. These cloth bands can be attached to parts of objects to be joined together, such as the portions of bags, blankets, clothing etc. The glide members of the glide fastener are not clamped onto the cloth band, as the clamps of the commonly known slide fasteners, but each member is shaped to slidably engage both beads. Thus, the glide members can, contrary to the above mentioned clamps, slide along the beads of the bands. The glide members are connected to one another by means of flexible pulling means, such as cords or the like, for instance.

When the glide fastener is manipulated, not only the slide handle slides as with the slide fastener, but also the glide members are displaced. These members glide along the beads until the pulling means connecting the slide members is stretched.

Glide fasteners and slide fasteners, the latter being known under the trade mark "Zipper," serve the same purpose but they are built in a completely different way.

The machine following the invention is characterized by automatically controlled means for preforming the glide members, for inserting the pulling means into the preformed glide members, for finishing the glide members and for fixing the latter to the pulling means.

The machine may have automatically controlled feeding means for transporting the work pieces between the automatically controlled means. It may also comprise a device for automatically feeding the material for the glide members from a stock band to the machine, an automatically controlled cutting device for cutting off and punching out of the stock the material necessary for each glide member and a device for an automatic removal of the finished lines.

Other objects and features will be apparent as the following description proceeds, reference being had to the accompanying drawings showing, by way of example, one embodiment of my invention, and wherein Figs. 1 and 1a together are a view of the machine, seen in the direction of feed of the band material.

Fig. 2 is a view of the outlet end of the machine.

Figs. 3 and 3a together are a side view of the feeding device for the band material and a section through the cutting tool and the first bending tool, parallel to the feeding direction of the band material and along line III—III of Fig. 12 or Fig. 13 respectively.

Fig. 4 is a view from the bottom of the punch of the cutting tool and of the first bending tool.

Fig. 5 is a side view of the punch and

Fig. 6 is a side view turned by 90° with regard to Fig. 5.

Figs. 7a-7c illustrate a glide member in three different manufacturing stages.

Fig. 8 is a section through the second bending tool along line VIII—VIII of Fig. 12 or Fig. 13 respectively.

Fig. 15 illustrates the driving device for the transporting slides between the first and the second and between the second and the third bending tool.

Figure 19:
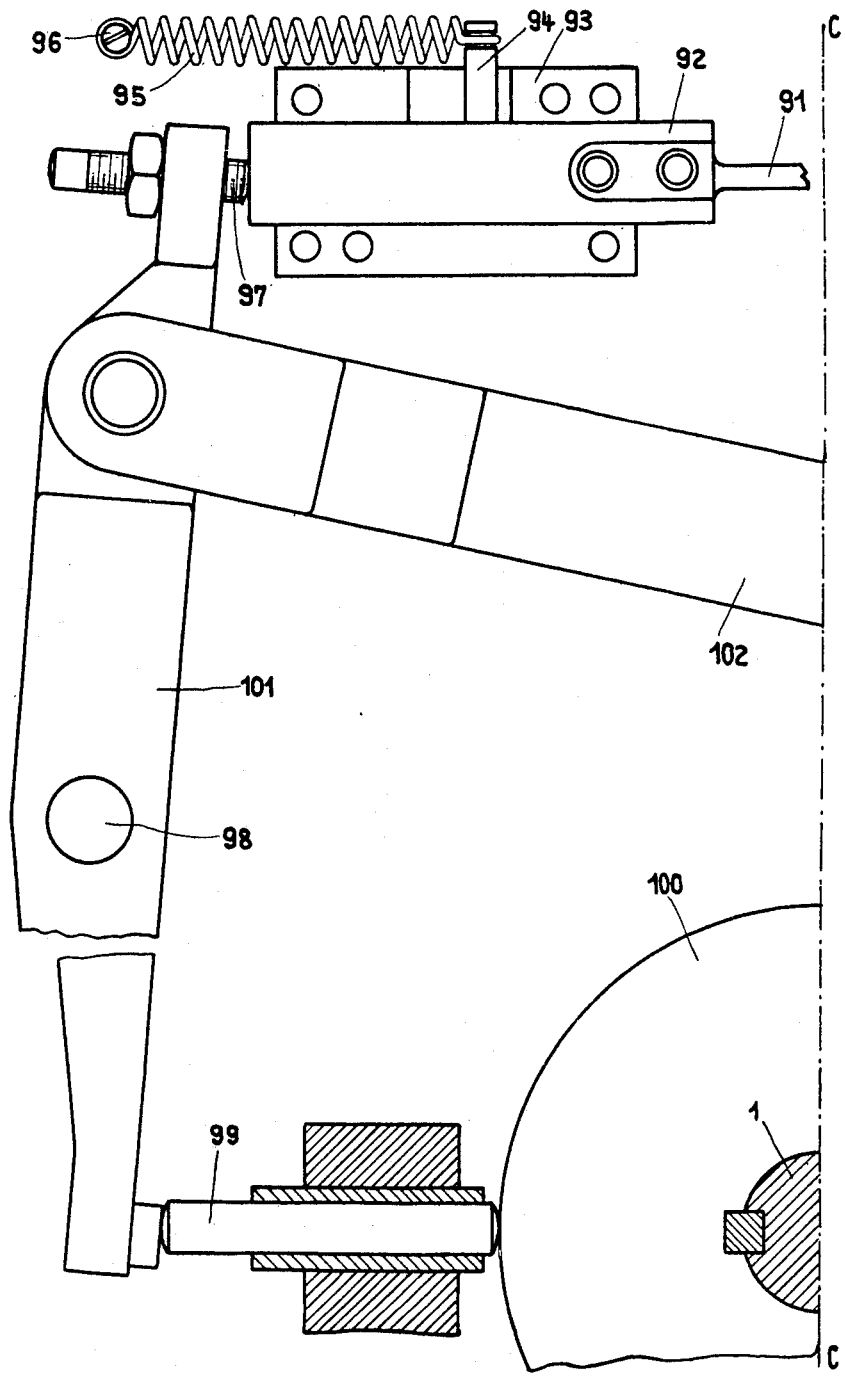

Figs. 19 and 19a together show the arrangement of and the drive means for the lateral bending tools.

Fig. 20 illustrates how a partly finished glide member is supported after the pulling means have been inserted.

Fig. 21 shows the same supporting, after the lateral bending tools have closed the lugs of the glide member.

Fig. 22 is a view of the mounting and of the control of the needles for inserting the pulling means into the lugs and of the bending tool finishing the glide members.

Figure 23:
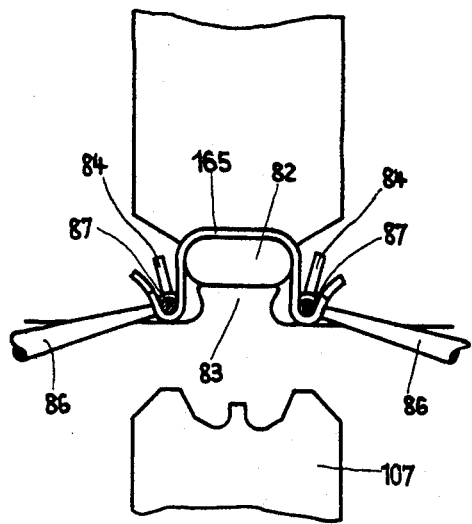

Fig. 23 shows a first mutual position between a partly finished glide member with the pulling means inserted therein and the finishing bending tool.

Figure 24:
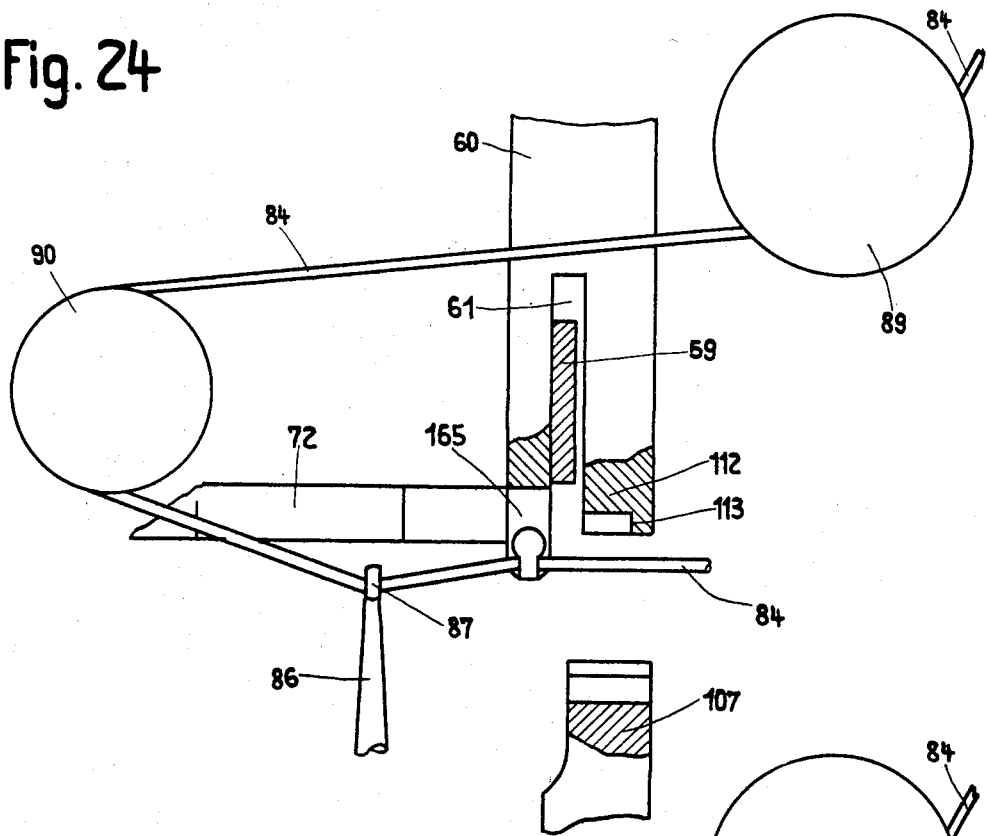

Fig. 24 illustrates in a side view the position corresponding to Fig. 23 of the needles and of the finishing bending tool.

Figure 25:
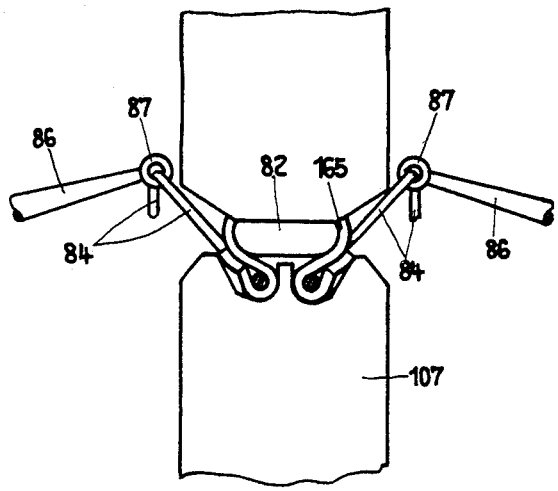

Fig. 25 shows a second mutual position between a finished glide member with the pulling means inserted therein and the finishing bending tool.

Figure 26:
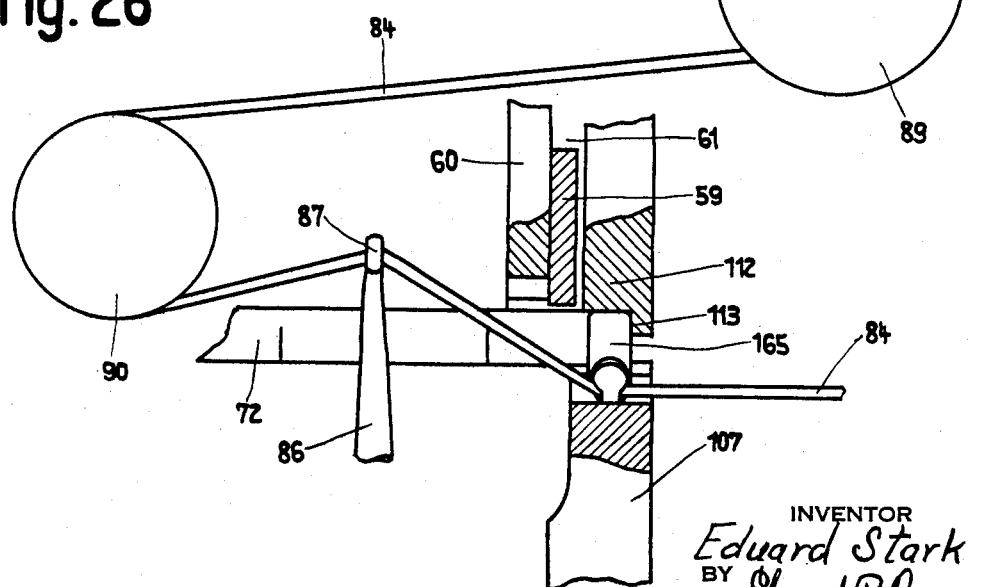

Fig. 26 shows in a side view the position corresponding to that of Fig. 25 of the needles and the finishing bending tool.

Figure 27:
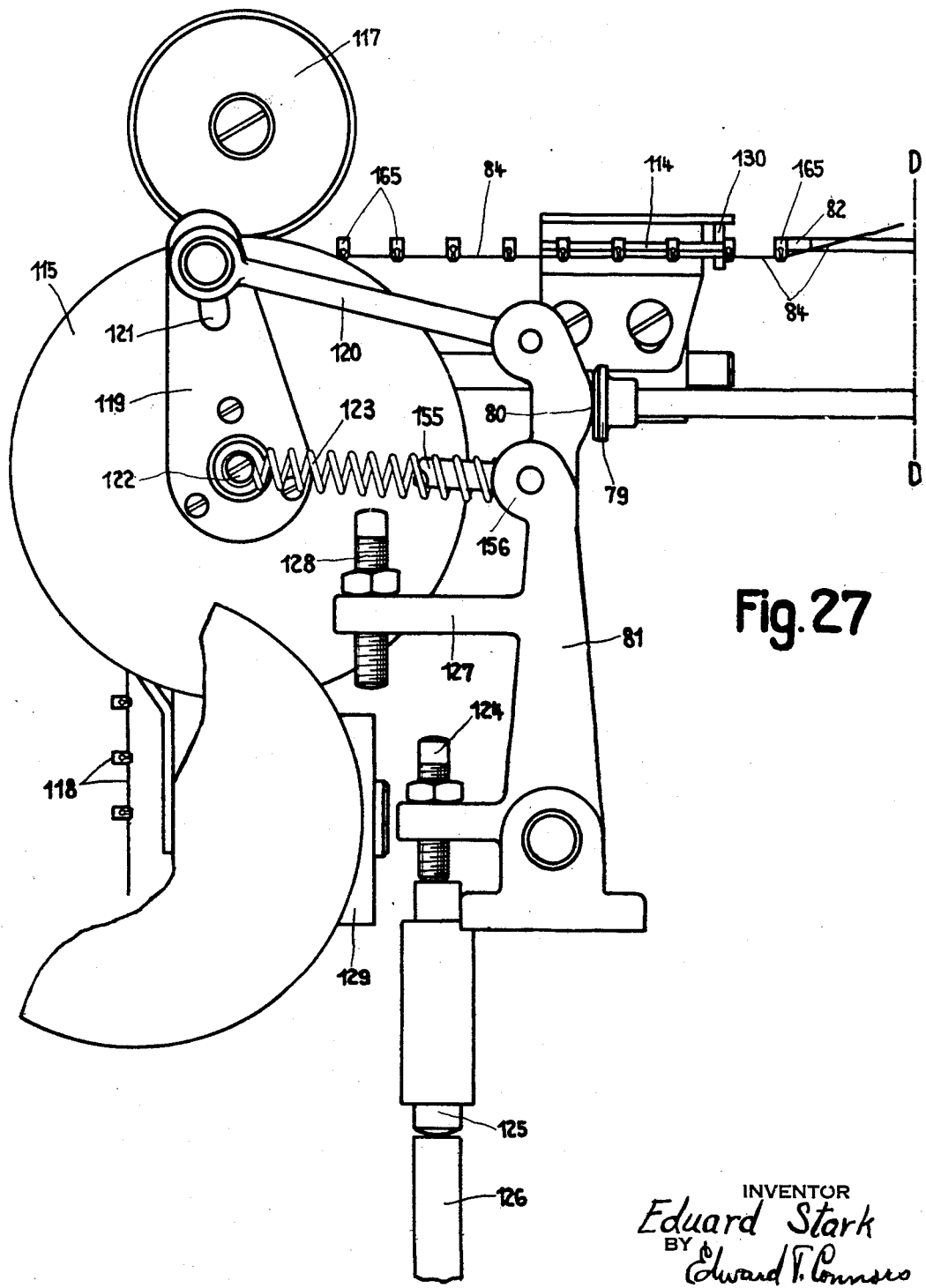

Figs. 27 and 27a together are a view of the device for discharging the finished line and for feeding the glide members fixed to the pulling means to a guide in front of the discharging device.

Fig. 28 is a cross section through a portion of the conveying disk and the pressing disk of Fig. 27.

Figure 29:
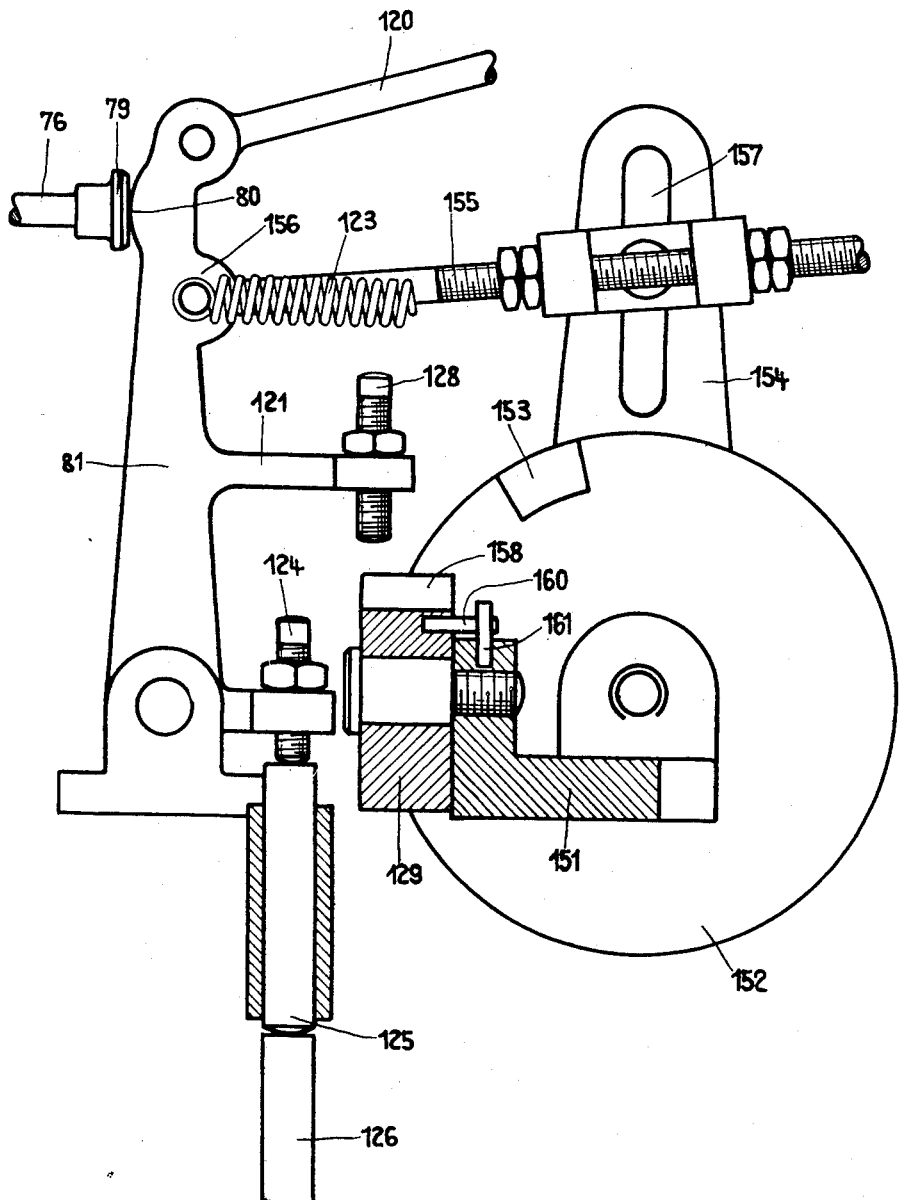

Fig. 29 is a partial sectional view of a part of the device of Fig. 27, seen in the opposite direction, and of a part of the device for increasing the distance between two lines following each other.

Fig. 30 is another partial sectional view of the device for increasing the distance.

Fig. 31 illusrates a modified embodiment of the needle drive means in its initial position and Fig. 32 the same modification of the needle drive means in its end position.

Fig. 33 is a cross section through the band material, from which the glide members are produced.

Figure 1:
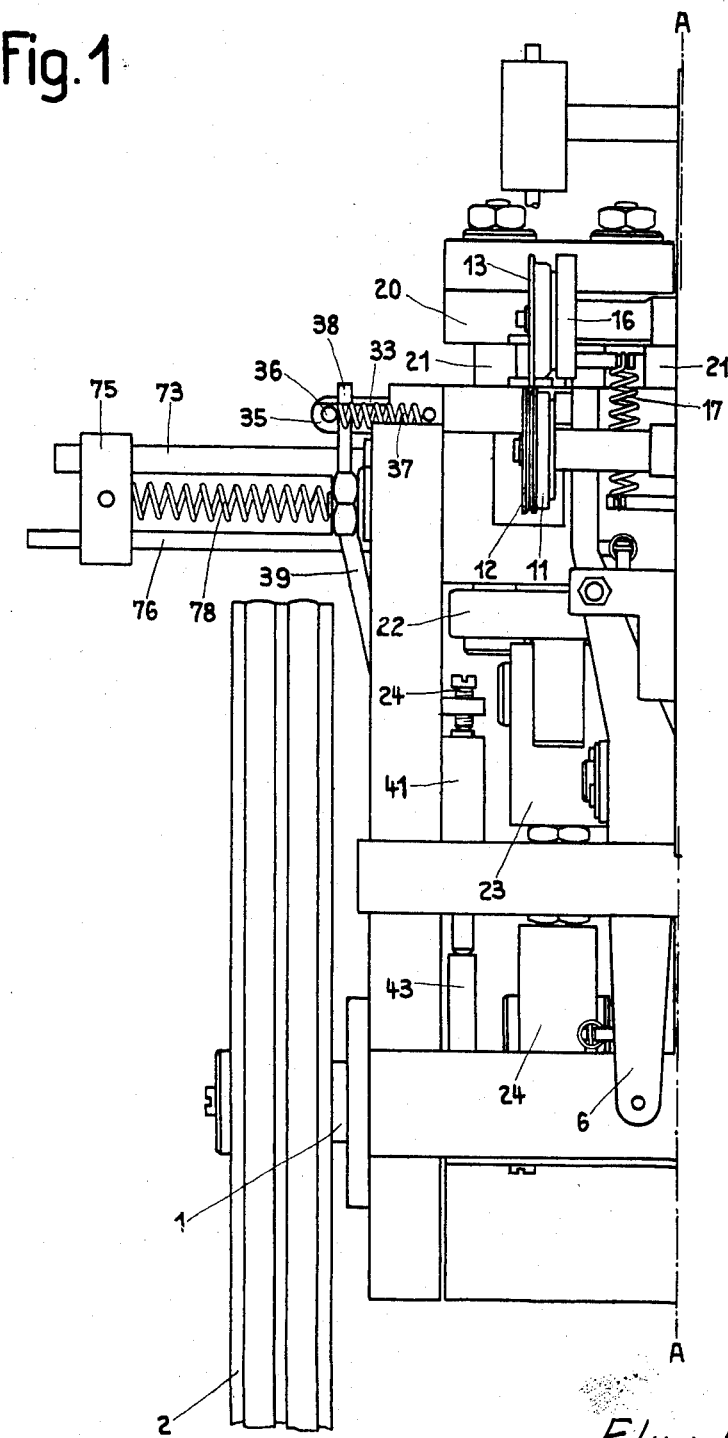
Figure 1A:
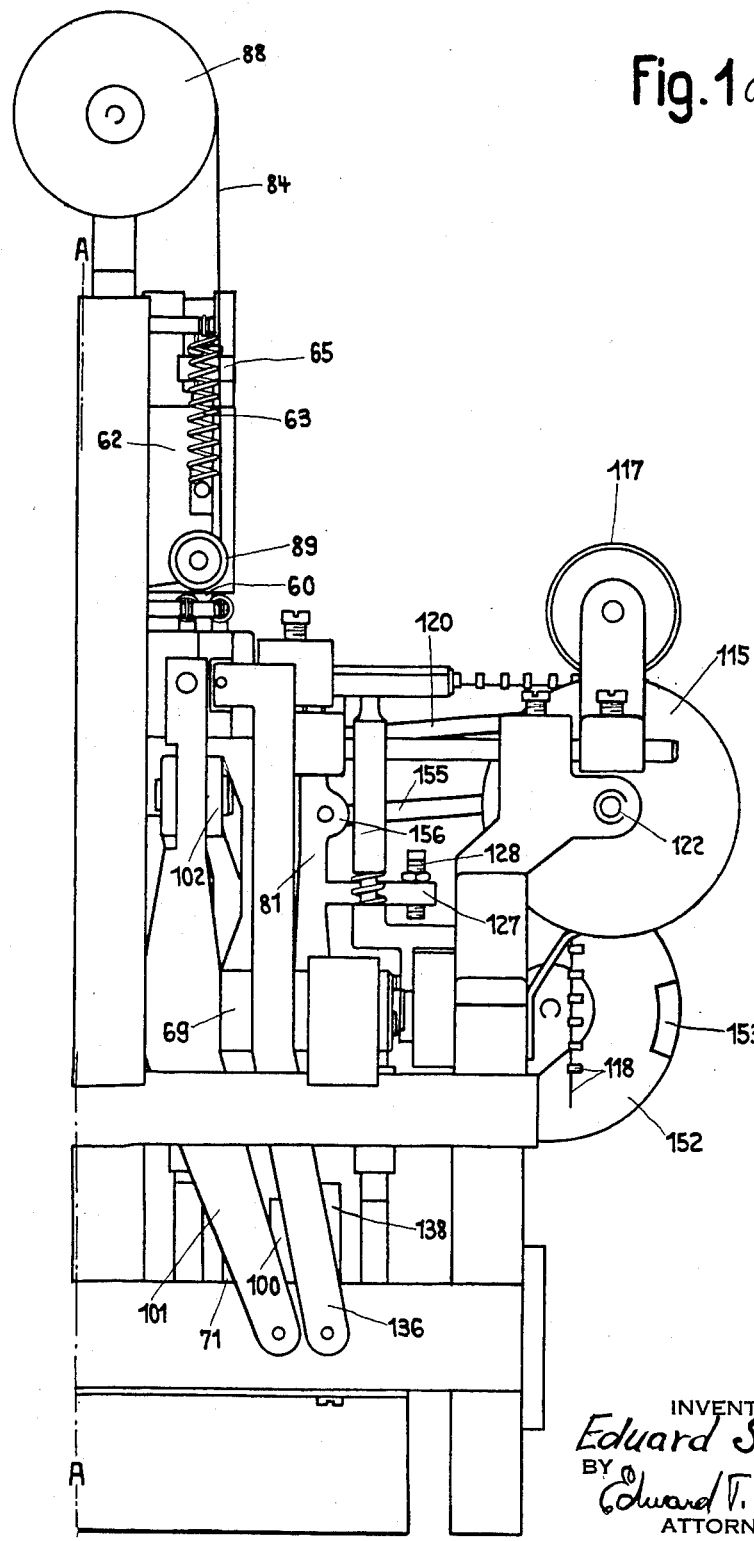

At the bottom of the machine is mounted the central camshaft 1 driven by a V-belt pulley 2. Shaft 1 carries a cam disk 3 acting through the intermediary of a feeler pin 4 onto a double-armed lever 6 rotatably mounted as at 5 and pressed onto the pin 4 by means of a spring 7. The rotation of lever 6 in anticlockwise direction of Fig. 3 is limited by a stop 8. At the upper free end of the lever 6 a cross bar 9 is mounted, one end of which is linked to a disk 10 and the other to a disk 11. Rotating in clockwise direction of Fig. 3, the disks 10 and 11 take along by friction a disk 12 each (Fig. 1). On the disks 10 and 11 rotating in anticlockwise direction, the disks 12 are held fast by a roller brake not shown. The counter disks 13 working together with the disks 12 are rotatable in anticlockwise direction only, while they are prevented by roller brakes (not shown) from a rotation in clockwise direction. As shown in Fig. 1, the disks 13 slightly engage profiles of the disks 12. The band material 14 for the glide members, coming from a stock roll not shown, is led through the space left between disks 12 and 13. The cross section of the band material 14 is shown in Fig. 33. The limit switch 15 contacting the band material 14 stops the machine as soon as the end of the band has passed the switch 15. Both disks 13 are rotatably mounted on a holder 16 pulled downwards by a spring 17, so that the disks 13 press the band 14 into the profile of the disks 12.

Figure 14:
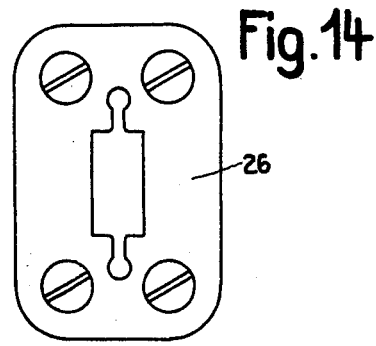
Fig. 14 is plan view of the matrix of the cutting and punching tool, which is to cooperate with the punch of Figs. 4, 5 and 6.

By the described feeding device the band material 14 is transported into a press comprising a stationary plate 18 with a guide 19 and a stripping plate for the band material 14. Above the plate 18 the head 20 of the press is provided. The head is mounted on columns 21 to slide up and down in the stationary part 166 of the press. To the lower end of the columns 21 a crosshead 22 is fixed, to which a piston rod 23 is linked, the eccentric ring 24 embraces an eccentric disk 25 of the central camshaft 1. The matrix 26 of the cutting and punching tool for cutting off and punching the band material section necessary for each glide member is inserted into the plate 18. The shape of the matrix 26 is shown in a plan view of Fig. 14. Beneath the matrix 26 is provided a bending matrix 27 of such a shape that on a down-stroke of the punch 28, the cut-off section of the band material is given the shape shown in Figs. 7b and 7c. The punch 28 is inserted into the head 20 and, in a front view seen from the bottom, has the shape shown in Fig. 4, while in two side views at right angles its appearance is that shown in Figs. 5 and 6. The edges situated outside the points 29 of Fig. 4 form cutting and punching edges which are to cooperate with the corresponding edges of the matrix 26 in order to give the rough work piece 165 the cut-out ends according to Fig. 7c. The cut-outs 30 of the rough piece are to receive the pulling means in order that the latter do not prevent the glide members of a line from contacting one another when pushed together.

Figure 13:
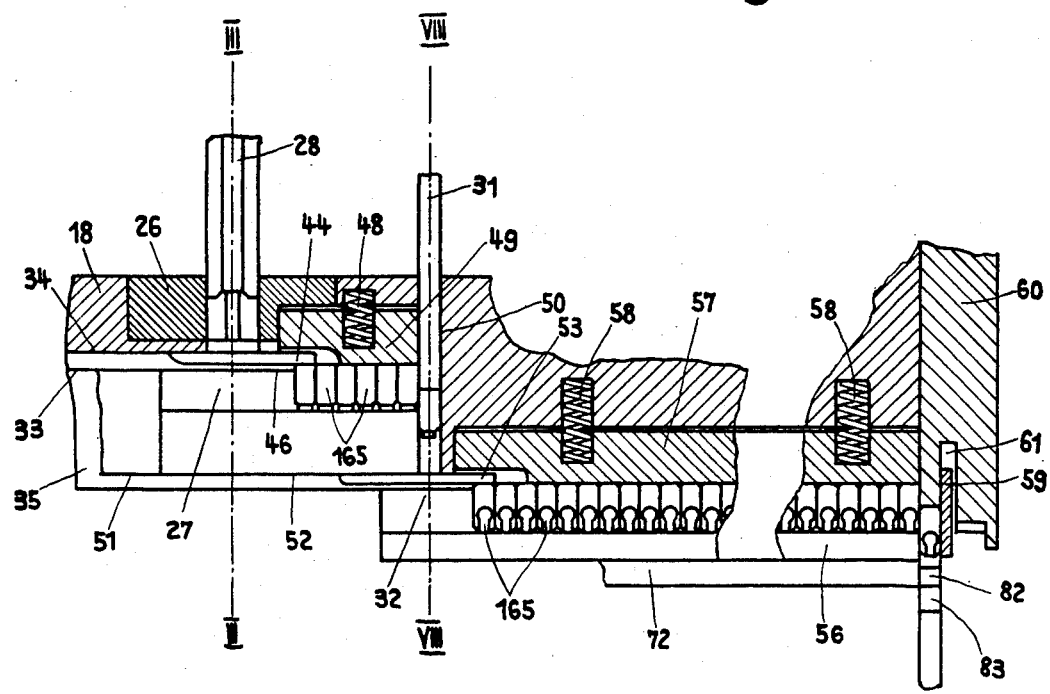
Fig. 13 is a cutout of Fig. 12 on a larger scale and in another mutual position of certain parts.
Figures 9, 10:
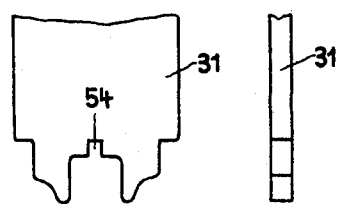
Figs. 9 and 10 are views, corresponding to Figs. 5 and 6, of the punch of the second bending tool.
Figure 11:
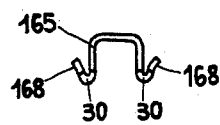
Fig. 11 shows the glide member to be manufactured after its having been worked upon by the second bending tool.
Figure 12:
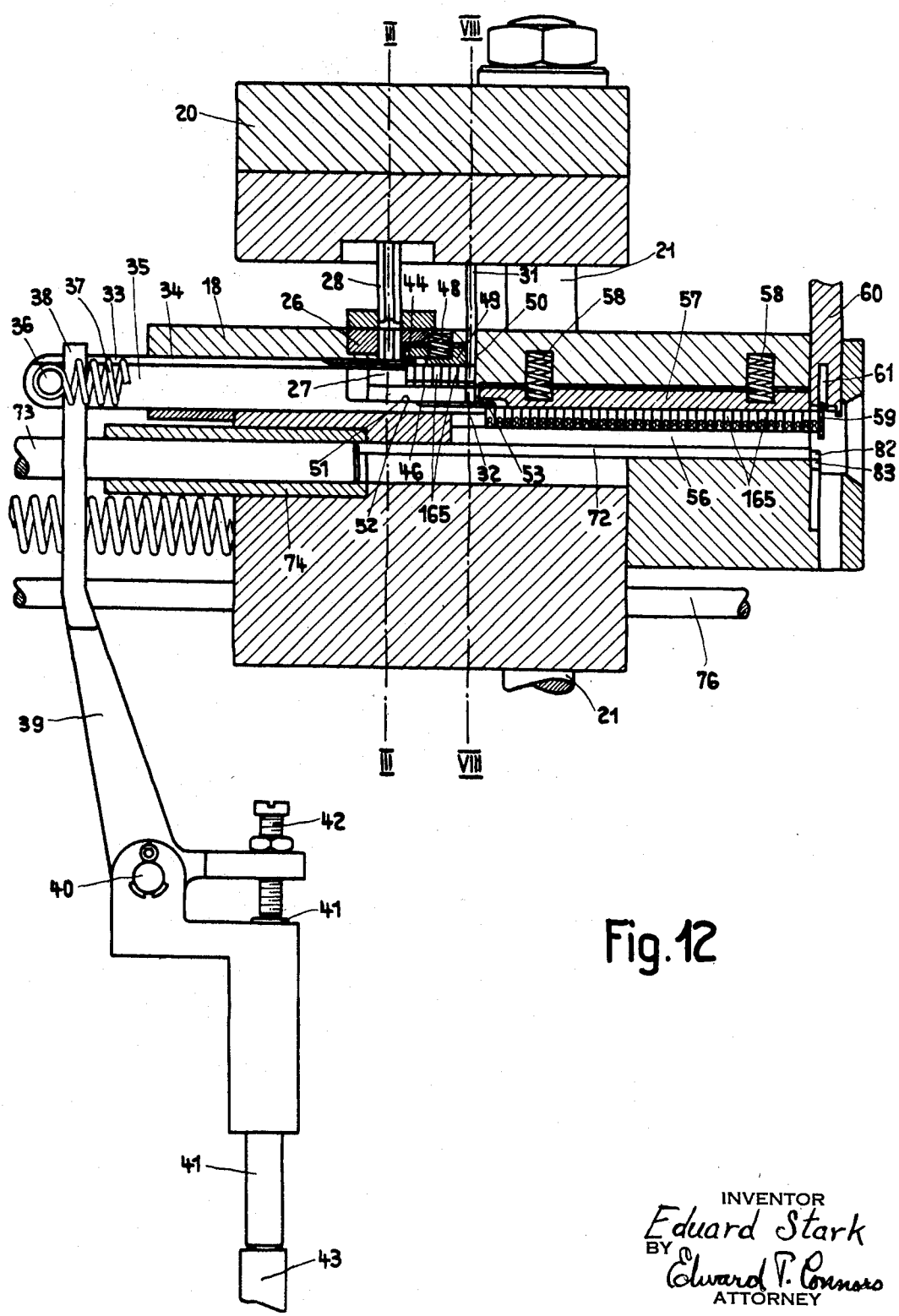
Fig. 12 is a section through the first two bending tools and the feeding ways, perpendicular to the feeding direction of the band material.

As shown in Figs. 12 and 13, other bending tools giving the rough piece 165 the shape of Figs. 20 and 11 are provided behind the tools 26 and 28. These tools are particularly shown in Fig. 8. They consist of the bending punch 31 inserted into the head 20 and of the matrix 32 lying in the stationary part 166 of the press. The shape of the punch 31 is shown in two side views, situated at right angles to each other, in Figs. 9 and 10.

A slide 33 serves for conveying the rough pieces 165 from the tools 26 and 28 to the tools 31 and 32. This slide runs in a guide 34 of plate 18, together with a slide 35 whose purpose will be described later on. The cross sections of the slides 33 and 35 are shown in Fig. 15 illustrating how these two slides guide each other. Each of the slides 33 and 35 has a laterally projecting pin 36 engaged by a spring 37 whose other end is attached to a fixed point in a manner not shown. Each of these springs tries to move its slide towards the right in Figs. 12 and 13. The free fork-shaped end of a control lever 39 leans against the pin 36 from the right in Fig. 12. This control lever 39, rotatably mounted on a pin 40, is supported on a pin 41 by means of an adjusting screw 42. The latter allows of a fine adjustment of the outermost end position of the slides 33 and 35. The pin 41 follows a cam disk 43 of the central camshaft 1. The springs 37 press the screw 42 against the pin 41 and the latter against the cam disk 43. The cam disk 43 either allows the springs 37 to drive the slides 33 and 35 towards the right in Fig. 12 or pushes the slides against the constraint of the springs 37 towards the left to the outermost end position. At its front side the slide 33 has a thinner portion with a projecting nose 44. This portion is to pass through the groove 45 of the punch 28 until its nose 44 lies above the rough piece 165 to serve the latter as a holding-down means. The extension of the guide 34 towards the right in Fig. 12 beyond the matrix 26 serves the rough pieces 165 as a conveying path to the tools 31 and 32. Along this path the rough pieces 165 ride on a guide rail 46 forming an extension of the middle portion 47 (Fig. 3) of the matrix 27. The rough pieces 165 riding on the rail 46 and having the shape shown in Fig. 7b are held in correct position on the rail 46 by a holding-down bar 49, slightly pressed onto the rough pieces by a spring 48. In Fig. 12, bar 33, by action of a spring 37, presses the foremost of the rough pieces riding on the rail 46 against the stationary wall 50.

Figure 16:
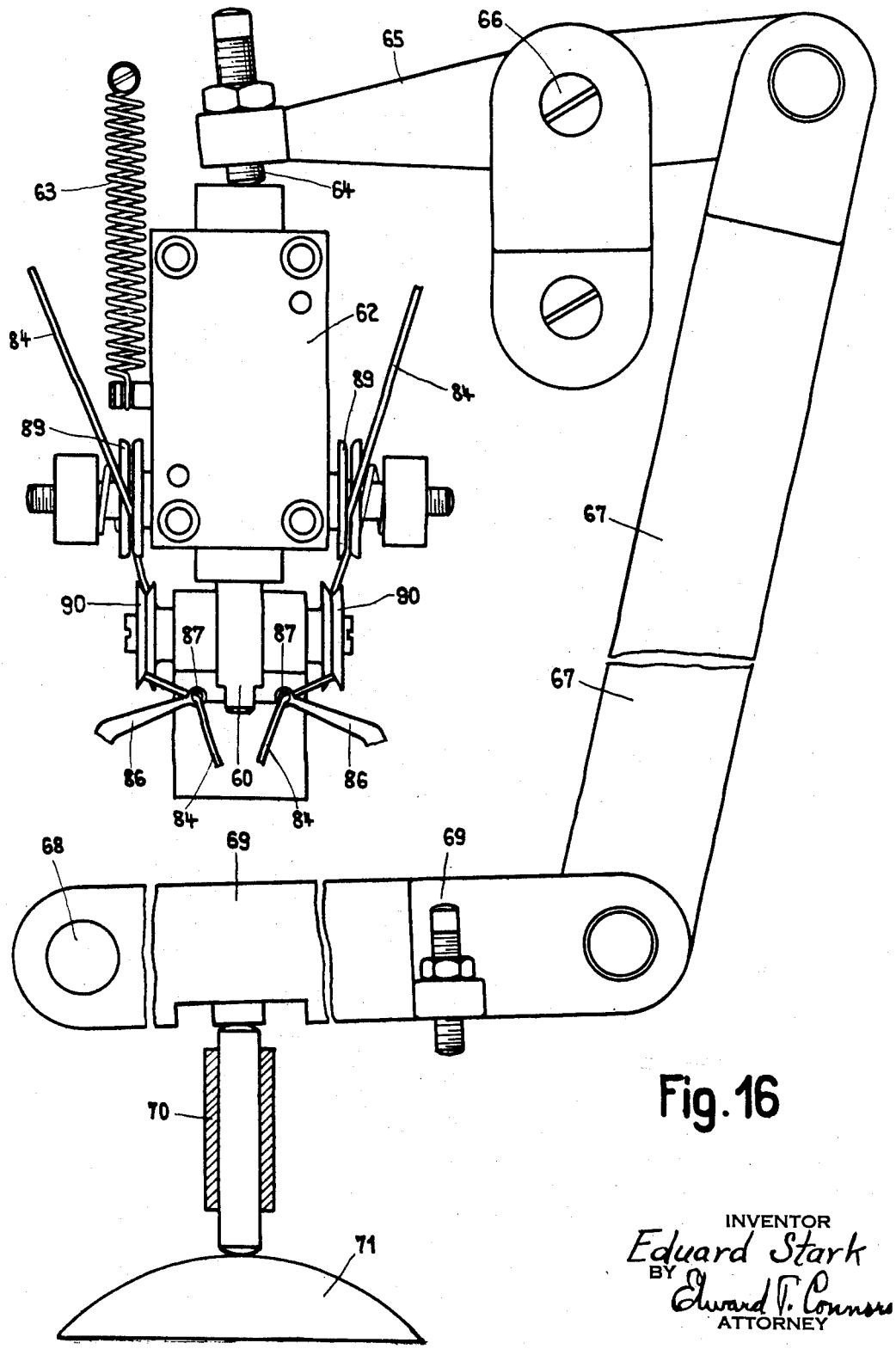
Fig. 16 shows the driving device for a holding down means within reach of the third and the fourth bending tools and the guide of the pulling means to be inserted into the glide members.
Figure 17:
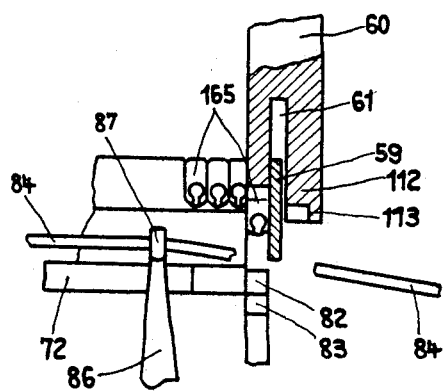
Fig. 17 shows a first position of the holding down means of Fig. 16 with regard to a feeding bar.
Figure 18:
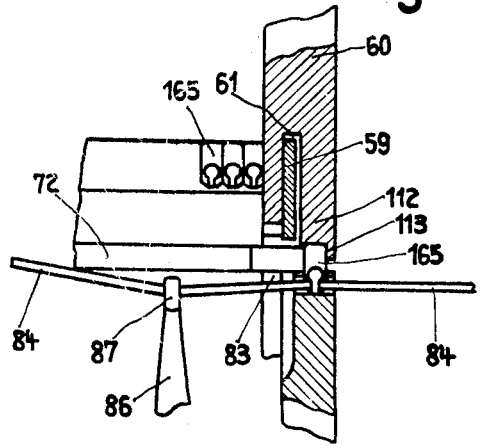
Fig. 18 illustrates another position of this holding down means with regard to the feeding bar and, furthermore, the last bending tool.

The thinner fore portion 51 of the rail 35 runs in a guide 52 whose upper wall is formed by the bottom edge of the rail 46. In the position of the parts according to Figs. 12 and 13 the thinner rail portion 51 extends above the matrix 32 up to the right side of the latter. Also rail 35 has a thinner portion whose end forms a nose 53, this portion being to pass through the groove 54 of the punch 31 until its nose 53 lies above the last of the rough pieces lying in front of it, to serve the rough piece as a holding down means. Towards the right in Figs 12 and 13, the middle portion 55 of the matrix 32 (Fig. 8) is followed by a guide rail 56 serving the rough pieces of the shape in Fig. 11, having been worked upon by the tools 31 and 32, as a conveying path to a further working place. The rough pieces 165 are slightly pressed against the rail 56 by a holding-down bar 57 loaded by springs 58. In the position of the parts shown in Fig. 12 the rail 35 presses the foremost of the rough pieces 165 riding on the rail 56 against a stationary stop 59. Within reach of this stop 59, a holding-down means 60 is mounted to move up and down. It has a groove 61 receiving the stop 59 on the holding-down means 60 being in the position shown in Figs. 13, 17 and 18. The drive of the holding-down means 60 is shown in Fig. 16. The means 60 is mounted to move up and down in a guide 62 and is pressed against the feeler 64 of the control lever 65 by means of a tension spring 63. This control lever is rotatably mounted by means of a pin 66 and its end away from the feeler 64 is connected with a link 67 coupled with a one-armed lever 69 mounted as at 68. Spring 63 presses lever 69 upon the feeler pin 70 following the cam disk 71 of the central camshaft 1. According to whether lever 65 moves in the anticlockwise or clockwise direction, the holding-down means is either moved downwards by the cam disk 73 against the action of spring 63 or the cam disks allow the spring 63 to return the holding-down means towards the top.

Figure 2:
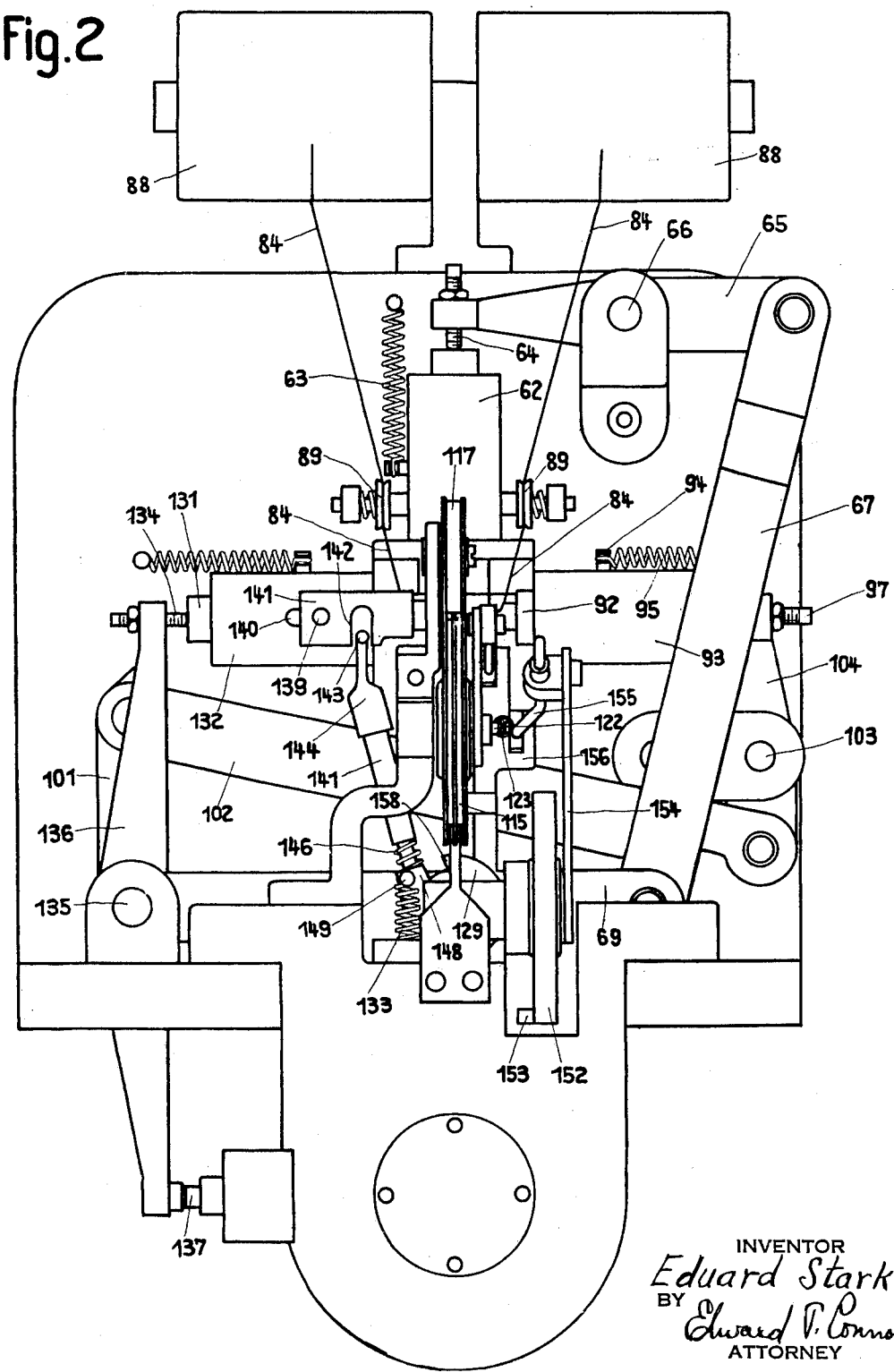

Underneath the guide rail 56 runs a transporting rail 72 attached to a rod 73 mounted to move to and fro in a horizontal guide 74 (Fig. 12), connected with a control bar 76 by means of a crosshead 75 (Fig. 27). A tension spring 78 fixed to the crosshead 75 and to a stationary point 77 tends to move the transporting rail 72 towards the left in Fig. 27 or towards the right in Figs. 12 and 13. Movement in the opposite direction is imparted to the transporting rail 72 against the constraint of spring 78 and through the intermediary of control bar 76 which is supported on the back 80 of the control lever 81 by means of a disk 79. The free fore end 82 of the transporting rail 72 has a cross section as shown in Figs. 20 and 21 and bars against the stationary support 83 on being in the position shown in Figs. 12, 13, 20 and 21. On the end 82 bearing against the support 83, the pulling means such as cords or wire 84 or the like are being inserted into the still open lugs 85 of the rough pieces shaped as in Fig. 20. This inserting is done by means of the needles 86 shown in Figs. 16, 17, 18 and 22 to 26. These needles have eyes 87 through which the pulling means 84 are drawn. The pulling means are supplied from stock rolls 88 (Figs. 1 and 2) and run at first over guide rollers 89 and 90 and then through the eyes 87 of the needles 86 (Fig. 16). Instead of two, only one stock roll 88 may be provided. From the eyes 87 onwards the pulling means 84 run forwards by the side of the transporting rail 72 towards the right in Figs. 17, 18, 24 and 26 or towards the left in Fig. 27. The needles 86 are linked to a slide 105 in a manner not shown. A spring not shown engages the needles and tends to approach them to each other. They are pressed by the spring against stationary control faces 106. When the slide 105 in Fig. 22 moves towards the top, the control faces 106 spread the needles 86 against the action of the spring not shown into the position of Fig. 25. On a down stroke of the slide 105, the control faces 106 allow the spring to drive the needles towards each other. Furthermore, the slide 105 carries the finishing bending tool 107 which is shown in Figs. 22 to 26 and whose working manner is described later on. The slide 105 is pressed against a feeler 110 by means of a spring 109 coupled with the slide by means of a pin 108, so that feeler 110 engages a cam disk 111 of the central camshaft 1. In Fig. 22, the cam disk 111 at one time moves the slide 105 towards the top against the constraint of spring 109 and at another time allows the spring 109 to drive the slide 105 downwards.

At the level of the support 83 (Fig. 21) and between the planes containing the two front faces of the rail end 82, the lateral bending tools 91 are provided as shown in Fig. 19. The front faces of these tools are profiled as illustrated in Fig. 21 and serve to close the lugs 85 of the rough pieces 165 by pressure. They are fixed to slides 92 running in guides 93. The one ends of tension springs 95 are connected with the slides 92 by means of pins 94 and the other ends with stationary points 96. On the front end of each slide, turned away from the tool 91, a pressure pin 97 is supported. One of these pressure pins is screwed into a double armed control lever 101 pivoted as at 98. Lever 101 is pressed against a feeler pin 99 by means of spring 95 and one of the slides 92, so that pin 99 follows the cam disk 100 of the central camshaft 1. A link 102 is connected with the control lever 101 and is coupled with a double-armed lever 104 pivoted as at 103. The free end of lever 104 carries the other pressure pin 97. When control lever 101 is moved in clockwise direction by the cam disk 110, the two bending tools 91 are approached to each other and close the lugs 85 of the rough piece by pressing the ends of the lugs against the support 83, thereby locking-in the pulling means previously inserted into the lugs (Fig. 21). When, by the springs 95, the lever 101 is swung in anti-clockwise direction, the lateral bending tools 91 are driven away from each other.

The finishing bending tool 107 lies in the same plane as the portion 112 of the holding-down means 60 lying outside of the groove 61. This external portion 112 has a lateral stop 113 preventing the transporting rail 72 from further movement towards the right when the holding-down means is in the position of Fig. 26. The portions 112 of the holding-down means 60 also serves as a counter holder for the rough pieces shaped as shown in Fig. 21 when they are bent by the finishing bending tool 107 into their finished shape of Fig. 25.

The device for discharging the finished glide fastener line and the means delivering the line over to the discharging device will now be described as follows: The glide members of the shape shown in Fig. 28, already attached to the pulling means 84 and riding on the fore end of the transporting rail 72 (at the left in Fig. 27) are at first delivered over to a guide rail 114 in a manner described later on. The line is pulled off this guide rail 114 by means of a disk 115 profiled at its circumference as shown in Fig. 28. When the glide members 165 of the line arrive within reach of the disk 115 they come to ride on a middle web 116 of disk 115, onto which they are pressed by counter disk 117. The glide members remain on this web during a 90°-revolution of disk 115, whereupon the line 118 moves on vertically towards the bottom as shown in Fig. 27. The drive of disk 115 has to take place step by step in anticlockwise direction of Fig. 27 and care must be taken that disk 115 cannot rotate backwards in clockwise direction. From this return movement disk 115 is prevented by a brake (not shown), a roller brake, or the like, provided between the disk 115 and its axle. On the latter also an arm 119 is provided, which, in anticlockwise direction, takes along disk 115 with the help of means (not shown), such as a roller coupling for instance, while on clockwise rotation of arm 119, any coupling with disk 115 is done away with. A link 120 is connected with arm 119 and with the free end of control lever 81. The one pin of the link 120 is adjustable along a slot 121 of arm 119 to allow adjustment of the angle of rotation of arm 119. A tension spring 123 attached to the stationary axle 122 of disk 115 and the lever 81 tends to swing the latter in anticlockwise direction of Fig. 27. Thereby, an adjusting screw 124 screwed into lever 81 is pressed onto an axially slidable feeler 125, and the latter onto a cam disk 126 of the central camshaft 1. Therefore, the cam disk 126 either moves the control lever 81 in clockwise direction of Fig. 27 against the constraint of spring 123 or allows the spring 123 to rotate the lever in anticlockwise direction, in order to drive the disk 115. The adjusting screw 128 screwed into a bracket 127 of lever 81 is to cooperate with a stop to limit the stroke of the transporting rail 72 towards the left in Fig. 27. In the illustrated example, this stop is in the shape of a cam disk 129, the purpose of which will be described later on.

Within reach of the fore end of the rail 114 there is a fork 130 (Figs. 27 and 30) movable into and out of reach of the rail 114. For that purpose it is mounted on a slide 131 slidable to and fro on a guide 132 (Fig. 30). Slide 131 is under the constraint of a spring not shown tending to urge it towards the left in Fig. 30 and thereby pressing it onto a pressure pin 134 of a double-armed control lever 136 pivoted as at 135. The end of the control lever 136 turned away from the pressure pin 134 is pressed onto a feeler pin 137 by means of this spring by the intermediary of the slide 131 and of the pressure pin 134, while feeler pin 137 is pressed onto a cam disk 138 of the central camshaft 1.

When a line of a prescribed length has been finished i. e. when the prescribed number of glide members have been fixed to the pulling means at an equal distance from one another, the distance between this line and the first glide member of the following line must be larger than the distance between adjacent glide members of the same line. For this reason, it is necessary that after the prescribed number of glide members of a line have passed, fork 130 does not embrace the rail 114 until the next line begins. For this purpose, the fork is swung out between two glide fastener lines in the direction of the arrow A of Fig. 30 by the following device: The fork 130 is swingingly mounted on a pin 200 by means of a bearing piece 141. The piece 141 is adjustably mounted on the slide 131 by means of a pin 139. Pin 201 serves as a stop to limit the swinging movement of fork 130; 202 is a locking screw for the slidable piece 141. Pin 139 passes through a slot 140 of the guide 132 to allow the slide 131 to move to and fro. Pin 143 of a sleeve 144 is coupled with the fork 130. Sleeve 144 consisting of two parts is slidably mounted on a pin 145 and is pressed outwardly onto the screw-head 147 by means of a spring 146 working upon the sleeve. Pin 145 is fixed to a bearing piece 148 swingingly mounted on the cam disk 129. A spring 133 engages by its one end the bearing piece 148 as at 149 and by its other end a stationary point. A disk 152 rotatably mounted on a bracket 151 has a lateral cam 153. This disk loosely placed on an axle is prevented from rotating in clockwise direction of Fig. 29 by means of a brake not shown, e. g. a roller brake. An arm 154 loosely mounted on the axle of disk 153, on an anticlockwise movement in Fig. 29, takes along the disk 152 by a means not shown, while, on a clockwise rotation of the arm 154 in Fig. 29, the disk 152 is locked. The arm 154 is connected with an eyelet 156 of lever 81 by means of a link 155. The pin coupling the link 155 with the arm 154 passes through a slot 157 of arm 154, and is adjustable along this slot for the purpose of adjusting the angle of rotation of the disk 152. The cam disk 129 has a steeply descending nose 158.

The above described device works as follows: On each step of the disk 115, corresponding to the distance between two adjacent glide members of a line, also disk 152 makes a step owing to its being coupled with lever 81 through the intermediary of link 155 and arm 154. On the disk 152 having accomplished a number of steps corresponding to the number of glide members of a line, the cam 153 of disk 152 strikes against a stop 159 of cam disk 129. However, before that, the adjusting screw 128 has engaged the cam disk 129 within reach of the largest radius of the latter to limit the stroke of the rail 72. If in Fig. 30 cam disk 129 is rotated in clockwise direction by means of cam 153 and stop 159, spring 123 can go on rotating lever 81 in the clockwise direction of Fig. 27 because also cam disk 129 allows such a movement for the time being. By this rotation of lever 81 beyond its normal angle of rotation disk 115 is swung by an additional angle in anticlockwise direction of Fig. 27 so that the pulling means 84 are advanced by an amount greater than the distance between two adjacent glide members. However, this has only become possible for the reason that on rotation of cam disk 129 in the clockwise direction of Fig. 30 the fork 130 has been swung in the direction of arrow A by means of the pin 145, the sleeve 144 and the pin 143, so that the fork 130 does not embrace the rail 114 on the slide 131 moving to and fro. The rotation of cam disk 129 in the anticlockwise direction of Fig. 30 is limited in that a stop 160 of disk 129 strikes against a stop 161 of bracket 151. As soon as the cam 153 has passed the stop 159, spring 133 turns back disk 129 into the position shown in Fig. 30 and the fork 130 arrives again in its working position.

By adjusting the screw 128, as well as by displacing the bearing piece 141 on the pin 139 and by displacing the guide rail 114 the distance between two adjacent glide members can be increased or decreased.

Figs. 31 and 32 show a modified arrangement of the needles for inserting the pulling means. The arms 162 are swingingly mounted on a common axle 163 of the slide 105 and with their other ends linked to a lever 164 each. These levers 164 are to rotate about stationary axles 205 and carry the eyelets 87 through which the pulling means are drawn. In Fig. 31 the eyelets lie at the largest distance from each other. When the slide 105 and the axle 163 in Fig. 31 move downwards, the arms 162 swing the levers 164 in such a way that the eyelets approach each other and move simultaneously downwards into the position of Fig. 32. In this position they insert the pulling means into the still open eyelets of the glide fastener members. By an upward movement of the slide 105 the eyelets arrive again in the position of Fig. 31.

Instead of two feeding disks 12 there could only be one.

The shape and the mutual position of the cam disks are neither illustrated nor described. However, I will now explain how the shown and described machine works and by means of this description any one skilled in the art will be able to choose the correct shape and position of the cam disks:

Starting from the position of the parts shown in Fig. 12, the head 20 with its punches 28 and 31 and the holding-down means 60 are in their uppermost position. On the rail 46 ride a number of rough pieces 165 shaped as shown in Fig. 7b, the foremost of which is pressed against the stationary wall 50 by means of the slide 33. The rough pieces shown in Fig. 7b are shaped as a U with upside down, having external flanges 168 at the free ends. On the rail 56 ride rough pieces 165 shaped as in Fig. 11, where the external flanges 168 are bent towards the legs of the U to prepare lugs for the pulling parts. The foremost of these rough pieces is pressed against the stop 59 by means of the slide 35. As shown in Fig. 3, the fore end of the band material 14 lies already on the matrix 26. The needles 86 are lifted so far that the finishing bending tool 107 is not yet in its working position. The lateral bending tools 91 are at the largest distance from each other. There is no rough piece on the end 82 of the transporting rail 72. The last glide member 165 fixed to the pulling means contacts the right side of the fork 130 in Fig. 27.

On rotation of the camshaft 1 head 20 and holding down means 60 start moving downwards. Fig. 13 shows an intermediate position during this downward motion. In Fig. 13 the punch 28 has already slightly entered the matrix 26 and has cut a section necessary for manufacturing a glide member off the band material 14 and has also stamped the ends of this section to give them the shape shown in Fig. 7c. The punch 31 has already pushed downwards the rough piece 165 lying under it a certain distance in the direction towards the matrix 32. The holding down means 60 on its down stroke under the constraint of the device shown in Fig. 16, has already approached to the end 82 of the transporting rail 72 along the stop 59 the foremost rough piece lying already out of reach of rail 56. The down stroke going on the punches 28 and 31 begin to cooperate with their matrices 27 and 32. Thereby, the tools 28 and 26 give the piece of Fig. 7a the shape of Fig. 7b, while the tools 31 and 32 change a rough piece from the shape of Fig. 7b into the shape of Fig. 11. The holding-down means 60 presses the rough piece 165 lying under it onto the end 82 of the rail 72. As shown in Fig. 20, piece 165 now rides on the end 82 supported on the support 83. Shortly before the cooperation of the punches 28 and 31 with their matrices 27 and 32, the cam disk 43 has pulled the slides 33 and 35 out of reach of the tools 28, 26 and 31, 32 by means of the levers 39 and 41 against the constraint of springs 37. By pulling back the slides 33 and 35 at the last possible moment, care is taken that the foremost rough pieces 165 lying outside the rails 46 and 56 are pressed against the stops 50 and 59 until the punch 31 or the holding down means 60 respectively has brought these rough pieces to a lower position, where they are guided between the wall 50 and the fore face of the rail 46 or between the stop 59 and the fore face of the rail 56 respectively (Fig. 13). As long as the holding down means holds the rough piece with still open lugs 85 in the position of Fig. 20 the needles 86 are moved downwards by the spring 109. Thereby, the eyelets 87 approach to each other and insert the pulling means 84 in the still open lugs 85 of the rough piece. As long as the needles 86 are in their lowermost position, the cam disk 100 approaches the lateral bending tools 91 to each other by means of the device shown in Fig. 19 and, as shown in Fig. 21, the tools 91 close the lugs 85 of the rough piece by pressing these lugs laterally against the support 83. The rough piece is now fixed to the pulling means 84. Immediately afterwards, the tools 91 go back to their initial position. The holding-down means 60 is lifted up to the position shown in Fig. 18 and the spring 78 brings the transporting rail 72 with the rough piece riding on it to the position shown in Fig. 18, where it strikes against the stop 113, whereupon the holding-down means 60 goes back to its lowermost position. During this motion of the control rail 72 from the position of Fig. 17 to that of Fig. 18, the control bar 76 has slightly turned the disk 115 in the anticlockwise direction of Fig. 27 by means of lever 81 and arm 119 after the cam disk 138 has previously allowed the spring (not shown in Fig. 30) to pull away the work 130 from the rail 114 towards the left in Fig. 30. After the motion of the control rail 72 from the position of Fig. 17 to that of Fig. 18, the glide member 165 which previously was at the right side of fork 130, now lies at the left side of fork 130 because the disk 115 has slightly advanced the line. After this advance movement the cam disk 138 has again brought the fork within reach of the rail 114.

Before the punches 28 and 31 begin to move upwardly the lever 39 allows the springs 37 to drive the slides 33 and 35 to the right in Fig. 12 until their noses 44 and 53 enter the grooves 45 and 54, while the end faces of the slides 33 and 35 lying under the noses 44 and 53 strike against the just deformed rough piece. Now on the punches 28 and 31 moving upwards, the noses 44 and 53 working as a holding-down means prevent an undesired lifting of these rough pieces and the slides 33 and 35, already before the upward motion of the punches 28 and 31, provide for the foremost rough pieces to be pressed against the punch 31 or the holding-down means 60 respectively. As soon as punch 31 and holding-down means 60 have passed the foremost rough pieces 165, the latter are pressed against the stops 50 and 59 by means of the slide 33 or 35 respectively. When the punches 28 and 31 are completely lifted, the position of Fig. 12 is again reached. Meanwhile, the band 14 has been advanced to the position shown in Fig. 3 by means of the automatically working feeding device of Fig. 3.

Meanwhile, the cam disk 111 shown in Fig. 22 has lifted the slide 105 with the finishing bending tool 107 and the needles 86 to the position shown in Figs. 25 and 26. The needles are now in their uppermost position where they are at the largest distance from each other and the tool 107 has given the rough piece the shape of a finished glide member 165 according to Fig. 25, whereby the holding-down means 60 has served the rough piece as a support. After this finish-shaping the tool 107, under the constraint of spring 109, goes slightly downwards only until the work piece 165 is free and not down to the inserting position of the needles 86. The holding down means 60 is lifted up to the position according to Fig. 12 by means of the spring 63 (Fig. 16).

Now the transporting rail 72 on the end 82 of which rides a finished glide member fixed to the pulling means 84, is free for a further movement to the left in Fig. 27, and this movement is imparted to the rail 72 by the spring 28 moving the control lever 81 towards the left in Fig. 27, through the intermediary of the control bar 76. The transporting rail 72 now brings the glide member up to the right hand wall of the fork 130. This forward motion of the transporting rail 72 is limited by the cam disk 129 and the screw 128. The link 120 is adjusted on the arm 119 in such a way that there is an initial tension in the pulling means 84 which pulls the glide member 165 carried by the rail 72 slightly off the rail 72 on the movement of the member towards the rail 114, so that at the end of the movement of rail 72 the glide member 165 slightly ascends on rail 114. Thereafter the cam disk 126 swings the control lever 81 in the clockwise direction of Fig. 27 and drives the transporting rail 72 towards the right in Fig. 27, whereby the end 82 of the rail 72 is completely drawn off the glide member. The control rail runs back to the position of Fig. 17 and the entire cycle begins again.

When the number of glide members required for a line are fixed to the pulling means 84, the cam 153 of the disk 152 strikes against the stop 159 of the cam disk 129 and rotates the cam disk in the clockwise direction of Fig. 30, so that the fork 130 is being swung out in the direction of the arrow A in the above described way and the disk 115 is allowed to run through an angle corresponding to a distance larger than the distance between two adjacent glide members of a line.

From the above description of the mode of operation of the machine it follows that the means for feeding the band material, the cutting and punching device for cutting off and punching out the material from the band 14 necessary for manufacturing a glide member, the means for preforming the glide members (punches and matrices 28, 26 or 31, 32, respectively, tools 91), for inserting the pulling means (needles 86), for finish-shaping and for fixing the glide members to the pulling means (tool 107) are automatically controlled and that also the device according to Figs. 27, 29 and 30 for discharging the finished lines works automatically. Furthermore, the transportation of the work pieces from the tools 28, 26 to the tools 31, 32 and from the latter to the tools 86, 91 and 107 is accomplished by automatic feeding means.

While I have shown and described one embodiment of my invention I do not wish to limit the scope of my invention thereto but reserve the right to make such modifications and rearrangements of the several parts that may come within the purview of the accompanying claims.

What I claim is:

1. In a machine for manufacturing glide fasteners fixed to flexible pulling means comprising a stationary part, a lug-forming punch, an automatically controlled movable press head slidably mounted on the stationary part carrying the lug-forming punch, a lug-forming matrix mounted on the stationary part, the lug-forming punch and the lug-forming matrix adapted to cooperate to form open lugs on the glides for the pulling means, an automatically controllable holding-down means movably mounted on the stationary part, a guide rail mounted on the stationary part, extending between the lug-forming matrix and the holding-down means, an automatically controlled slide slidably mounted on the stationary part for pushing rough finished glide members on the guide rail from the lug-forming punch and lug-forming matrix to the automatically controlled holding-down means, an automatically controlled feeding rail movably mounted on the stationary part receiving the rough finished glide members from the holding-down means, automatically controlled needles movably mounted on the stationary part and lying in reach of the same end of said guide rail as said holding-down means, for inserting the pulling means into the open lugs, the needles having eyelets for the pulling means, and an automatically controlled lateral bending tool movably mounted on the stationary part, lying in reach of the same end of said guide rail as said holding-down means and closing the lugs after the pulling means has been inserted therein.

2. The machine of claim 1 in which a preforming punch is on said head in front of said lug-forming punch, a stationary preforming matrix mounted on the stationary part, positioned in front of and at a higher level than the lug-forming matrix, the preforming punch and preforming matrix adapted to form rough pieces into an inverted U with external flanges, and a cutting and punching matrix mounted on the stationary part, the preforming punch also cooperating with the cutting and punching matrix.

3. The machine of claim 2 in which another automatically controlled slide is slidably mounted on the stationary part and positioned beside said automatically controlled slide for carrying inverted U-shaped rough pieces from the preforming punch and preforming matrix to the lug-forming punch and lug-forming matrix.

4. The machine of claim 3 in which noses are provided for both slides on their fore ends for engagement of the rough pieces from the punches and acting as holding-down means for the rough pieces during backward movement of the punches.

5. In a machine for manufacturing glide fasteners fixed to flexible pulling means comprising a stationary part, a lug-forming punch, an automatically controlled movable press head slidably mounted on the stationary part, carrying the lug-forming punch, a lug-forming matrix mounted on the stationary part, the lug-forming punch and the lug-forming matrix adapted to cooperate to form open lugs on the glides for the pulling means, an automatically controllable holding-down means movably mounted on the stationary part, a guide rail mounted on the stationary part, extending between the lug-forming matrix and the holding-down means, an automatically controlled slide slidably mounted on the stationary part for pushing rough finished glide members on the guide rail from the lug-forming punch and lug-forming matrix to the automatically controlled holding-down means, an automatically controlled feeding rail movably mounted on the stationary part, receiving the rough finished glide members from the holding-down means, automatically controlled needles movably mounted on the stationary part and lying in reach of the same end of said guide rail as said holding-down means, for inserting the pulling means into the open lugs, the needles having eyelets for the pulling means, an automatically controlled lateral bending tool movably mounted on the stationary part, lying in reach of the same end of said guide rail as said holding-down means and closing the lugs after the pulling means has been inserted therein, and an automatically controllable finishing bending tool movably mounted on the stationary part, lying behind the lateral bending tool for finishing the closed lugs, the holding-down means acting as a counter holder.

6. The machine of claim 5 in which a common slide movably mounted on the stationary part is provided mounting the finishing bending tool and the needles.

7. In a machine for manufacturing glide fasteners fixed to flexible pulling means comprising a stationary part, a lug-forming punch, an automatically controlled movable press head slidably mounted on the stationary part, carrying the lug-forming punch, a lug-forming matrix mounted on the stationary part, the lug-forming punch and the lug-forming matrix adapted to cooperate to form open lugs on the glides for the pulling means, an automatically controllable holding-down means movably mounted on the stationary part, a guide rail mounted on the stationary part, extending between the lug-forming matrix and the holding-down means, an automatically controlled slide slidably mounted on the stationary part for pushing rough finished glide members on the guide rail from the lug-forming punch and lug-forming matrix to the automatically controlled holding-down means, an automatically controlled feeding rail movably mounted on the stationary part, receiving the rough finished glide members from the holding-down means, automatically controlled needles movably mounted on the stationary part and lying in reach of the same end of said guide rail as said holding-down means, for inserting the pulling means into the open lugs, the needles having eyelets for the pulling means, an automatically controlled lateral bending tool movably mounted on the stationary part, lying in reach of the same end of said guide rail as said holding-down means and closing the lugs after the pulling means has been inserted therein, a finished slide fastener line, a conveying disk for said line, an axle for the conveying disk, an automatically controllable driving means mounted on the axle for movement of the conveying disk in one direction only, a control bar movably mounted on the stationary part, an automatically controllable control lever pivoted on the stationary part and in drive connection with said driving means controlling the feeding rail by the control bar, a stationary rail mounted on the stationary part between the feeding rail and the conveying disk, the stationary rail adapted to receive glides fixed to the pulling means conveyed by the feeding rail, a stop movably mounted on the stationary part at the fore end of the stationary rail, and drive means for automatically bringing the stop into and out of reach of the stationary rail.

8. The machine of claim 7 in which a reciprocating slide is provided on the stationary part, the stop swingingly mounted on the slide, means allowing the swinging of the stop in a required rhythm bringing the stop out of reach of the stationary rail on the passage of a multiple of the distance between two adjacent glides of a line, said means including a cam disk rotatably mounted on the stationary part, having a steeply descending cam, a rod connecting the cam disk with the stop, a spring connected with said cam disk and the stationary part to bring the cam disk back to its normal working position, the cam disk serving the control lever as a stop at the end of its working movement, a disk pivoted on the stationary part having a cam, the disk arranged so as to be rotatable by the control lever in one direction only, and a stop on said control lever, the cam after a predetermined number of moving steps swinging the cam disk out of its normal position against the constraint of its spring to allow the control lever stop to drop into the lowermost point of the cam disk.

References Cited in the file of this patent
UNITED STATES PATENTS

| | | |
|---|---|---|
| 1,011,104 | Bates | Dec. 5, 1911 |
| 1,467,015 | Sundback | Sept. 4, 1923 |
| 1,653,320 | Sundback | Dec. 20, 1927 |
| 1,966,256 | Marinsky | July 10, 1934 |
| 2,013,706 | Wiesenfeld | Sept. 10, 1935 |
| 2,078,017 | Poux | Apr. 20, 1937 |
| 2,321,286 | Firing | Feb. 11, 1941 |